(12) United States Patent
Beskrovny et al.

(10) Patent No.: US 10,542,040 B2
(45) Date of Patent: Jan. 21, 2020

(54) METHOD AND APPARATUS FOR PREVENTING INJECTION-TYPE ATTACK IN WEB-BASED OPERATING SYSTEM

(71) Applicant: Samsung Electronics Co., Ltd., Suwon-si, Gyeonggi-do (KR)

(72) Inventors: Evgeny Beskrovny, Yaqum (IL); Maya Maimon, Yaqum (IL); Yaacov Hoch, Yaqum (IL)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 15/527,159

(22) PCT Filed: Nov. 17, 2015

(86) PCT No.: PCT/KR2015/012352
§ 371 (c)(1),
(2) Date: May 16, 2017

(87) PCT Pub. No.: WO2016/080735
PCT Pub. Date: May 26, 2016

(65) Prior Publication Data
US 2017/0357804 A1 Dec. 14, 2017

Related U.S. Application Data

(63) Continuation of application No. 14/542,943, filed on Nov. 17, 2014, now abandoned.

(30) Foreign Application Priority Data

Oct. 12, 2015 (KR) .................. 10-2015-0142302

(51) Int. Cl.
*H04L 29/06* (2006.01)
*H04W 4/60* (2018.01)
(Continued)

(52) U.S. Cl.
CPC .......... *H04L 63/1466* (2013.01); *G06F 16/10* (2019.01); *G06F 16/986* (2019.01);
(Continued)

(58) Field of Classification Search
CPC .................. G06F 21/53; G06F 21/554; G06F 21/562–563
(Continued)

(56) References Cited

U.S. PATENT DOCUMENTS 7,565,543 B1 7/2009 Mungale
8,505,070 B2 8/2013 Sterland et al.
(Continued)

FOREIGN PATENT DOCUMENTS

EP 0 813 133 A2 12/1997
EP 1 843 250 A1 10/2007

OTHER PUBLICATIONS

European Search Report dated Oct. 18, 2018, issued in European Patent Application No. 15195053.2.
(Continued)

*Primary Examiner* — Khalil Naghdali
(74) *Attorney, Agent, or Firm* — Jefferson IP Law, LLP

(57) ABSTRACT

The present disclosure relates to an intelligent service (e.g., a smart home, a smart building, a smart car, etc.) based on a 5G communication technology and an IoT related technology. In accordance with an embodiment of the present disclosure, a method is provided for detecting, by a web server in a wireless communication system, a malicious code which is injected into the command stream of a widget miming on a web-based OS in a device. The method includes: analyzing the widget in the web server; determining at least one invariant condition constantly maintained and conserved while the widget is running, on the basis of a result of the analyzing; generating a metadata file including data satisfying the at least one invariant condition; and associating the metadata file with the widget and providing the widget in a state in which the associated metadata file is included in the widget.

16 Claims, 4 Drawing Sheets

(51) Int. Cl.
*G06F 16/10* (2019.01)
*G06F 16/958* (2019.01)
*G06F 21/53* (2013.01)
*G06F 21/56* (2013.01)
*H04W 12/12* (2009.01)
*G06F 17/27* (2006.01)
*G06F 21/55* (2013.01)
*H04L 29/08* (2006.01)

(52) U.S. Cl.
CPC ............ *G06F 17/272* (2013.01); *G06F 21/53* (2013.01); *G06F 21/554* (2013.01); *G06F 21/562* (2013.01); *G06F 21/563* (2013.01); *H04L 63/1425* (2013.01); *H04W 4/60* (2018.02); *H04W 12/1208* (2019.01); *G06F 2221/2107* (2013.01); *G06F 2221/2113* (2013.01); *G06F 2221/2119* (2013.01); *H04L 67/02* (2013.01)

(58) Field of Classification Search
USPC .......................................................... 726/23
See application file for complete search history.

(56) References Cited

U.S. PATENT DOCUMENTS

| | | |
|---|---|---|
| 8,683,593 B2 | 3/2014 | Mahaffey |
| 8,752,183 B1 | 6/2014 | Heiderich et al. |
| 2004/0003248 A1 | 1/2004 | Arkipov |
| 2008/0184041 A1 | 7/2008 | Jakubowski et al. |
| 2009/0282480 A1 | 11/2009 | Lee et al. |
| 2010/0070804 A1 | 3/2010 | Bolignano et al. |
| 2011/0252475 A1 | 10/2011 | Mui et al. |
| 2013/0160126 A1 | 6/2013 | Kapoor et al. |
| 2014/0066015 A1 | 3/2014 | Aissi |
| 2014/0181976 A1 | 6/2014 | Snow et al. |
| 2014/0215614 A1* | 7/2014 | Beskrovny ............ G06F 21/51 726/23 |
| 2014/0282876 A1 | 9/2014 | Schentrup et al. |
| 2014/0283067 A1 | 9/2014 | Call et al. |
| 2014/0331281 A1 | 11/2014 | Bettini et al. |
| 2014/0358916 A1 | 12/2014 | Anand et al. |
| 2015/0256556 A1* | 9/2015 | Kaminsky ............ H04L 63/168 726/23 |
| 2015/0326586 A1 | 11/2015 | Khesin |
| 2015/0350243 A1* | 12/2015 | Call .................... H04L 63/1441 726/23 |
| 2016/0099963 A1* | 4/2016 | Mahaffey ............ H04L 63/0227 726/25 |
| 2016/0127412 A1* | 5/2016 | Beskrovny .......... H04L 63/1466 726/23 |
| 2019/0303586 A1* | 10/2019 | Mahaffey ............ H04W 12/02 |
| 2019/0311134 A1* | 10/2019 | Mahaffey ............ H04L 63/166 |

OTHER PUBLICATIONS

Pietraszek et al.. "Defending Against Injection Attacks Through Context-Sensitive String Evaluation", Lecture Notes in Computer Science vol. 3858, 2006, pp. 124-145—abstract only from http://link.springer.com/chapter/10.1007/11663812_7.

Trevor et al., "Defeating script injection attacks with browser-enforced embedded policies"; WWW '07 Proceedings of the 16th international conference on World Wide Web pp. 601-610—abstract only from http://dl.acm.org/citation.cfm?id=1242654.

\* cited by examiner

[Fig. 1]
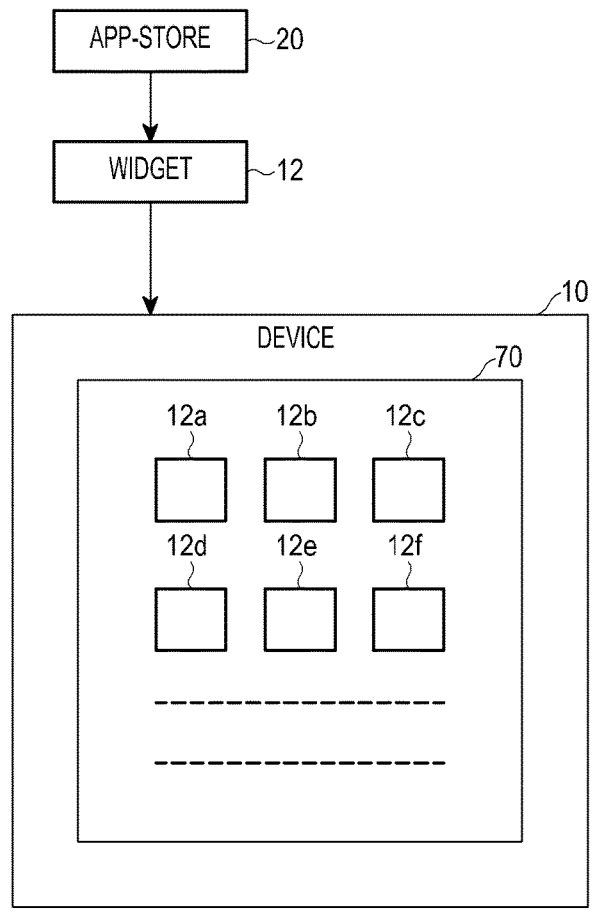
[Fig. 2]
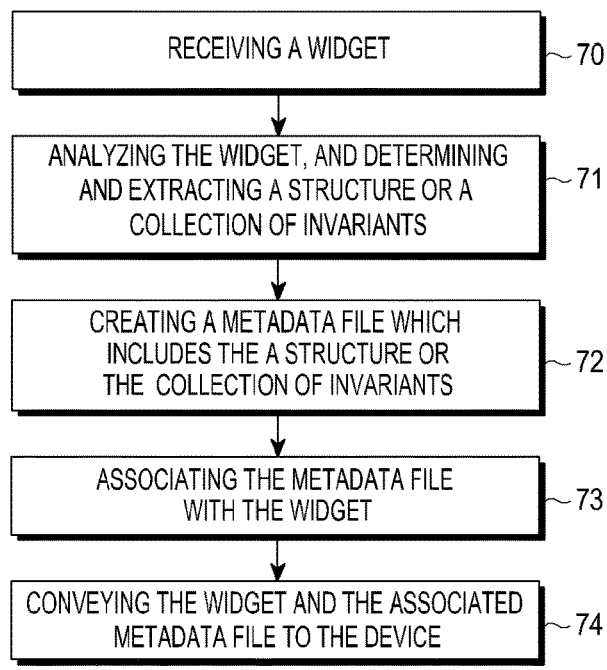

[Fig. 3]
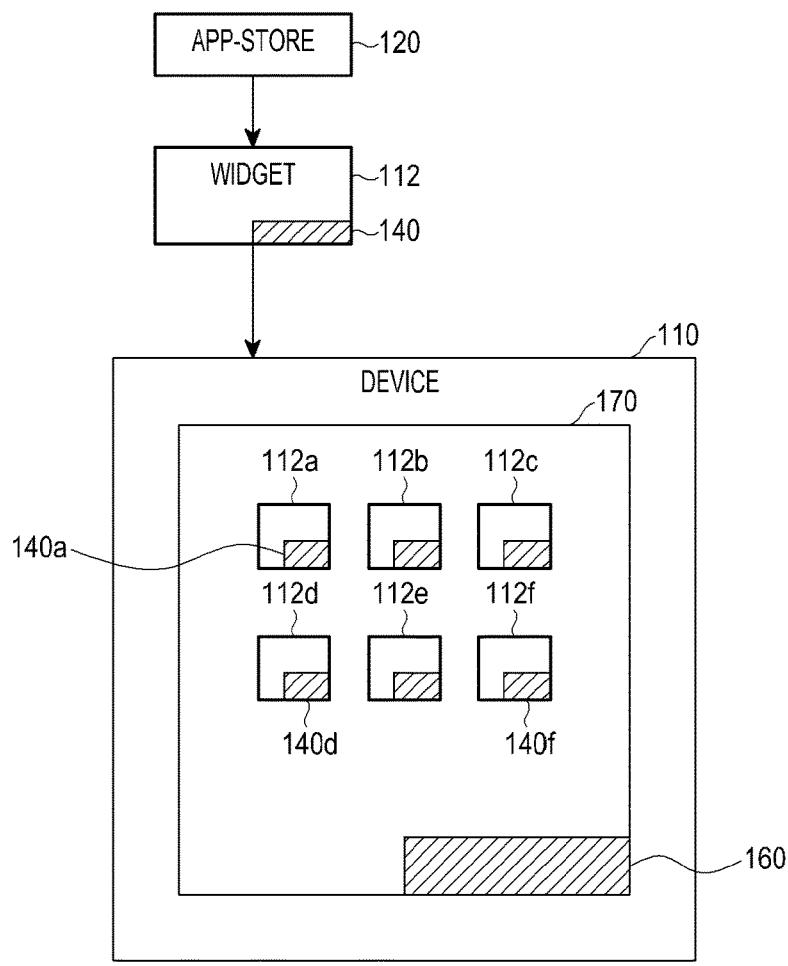
[Fig. 4]
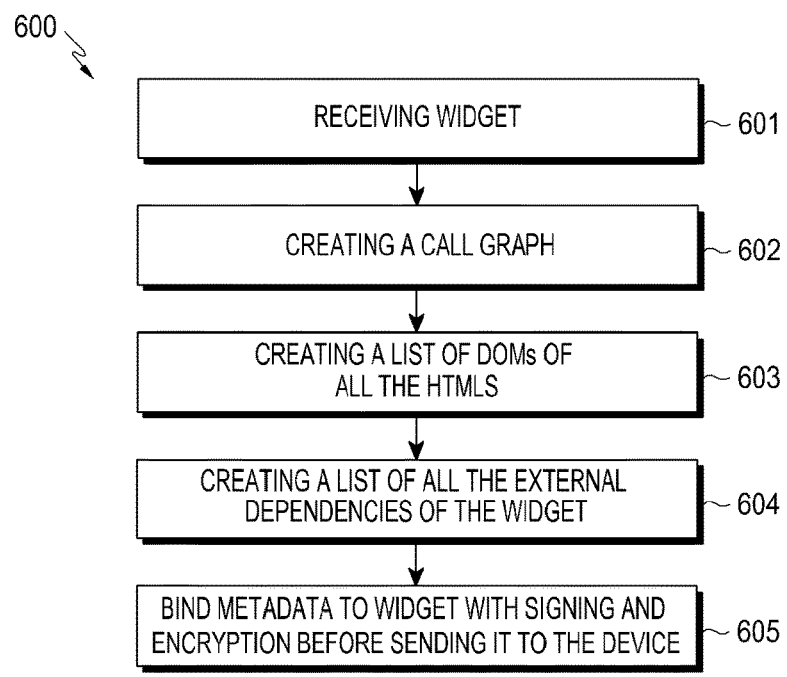

[Fig. 5]
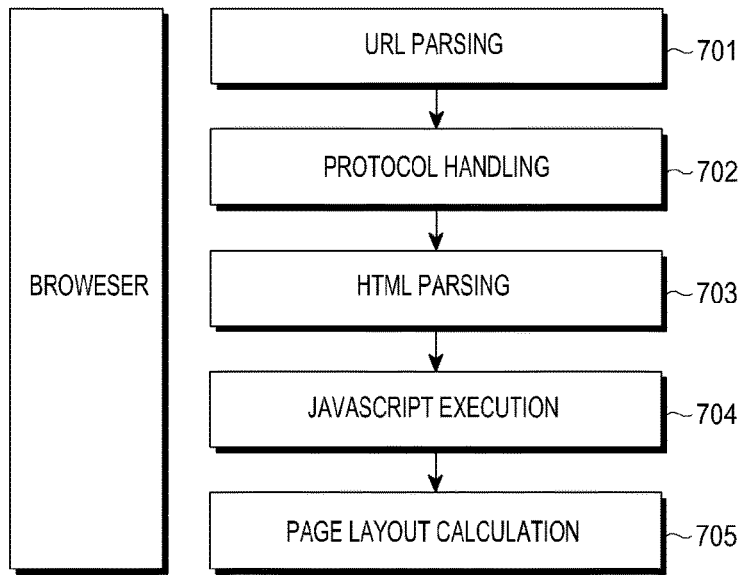
[Fig. 6]
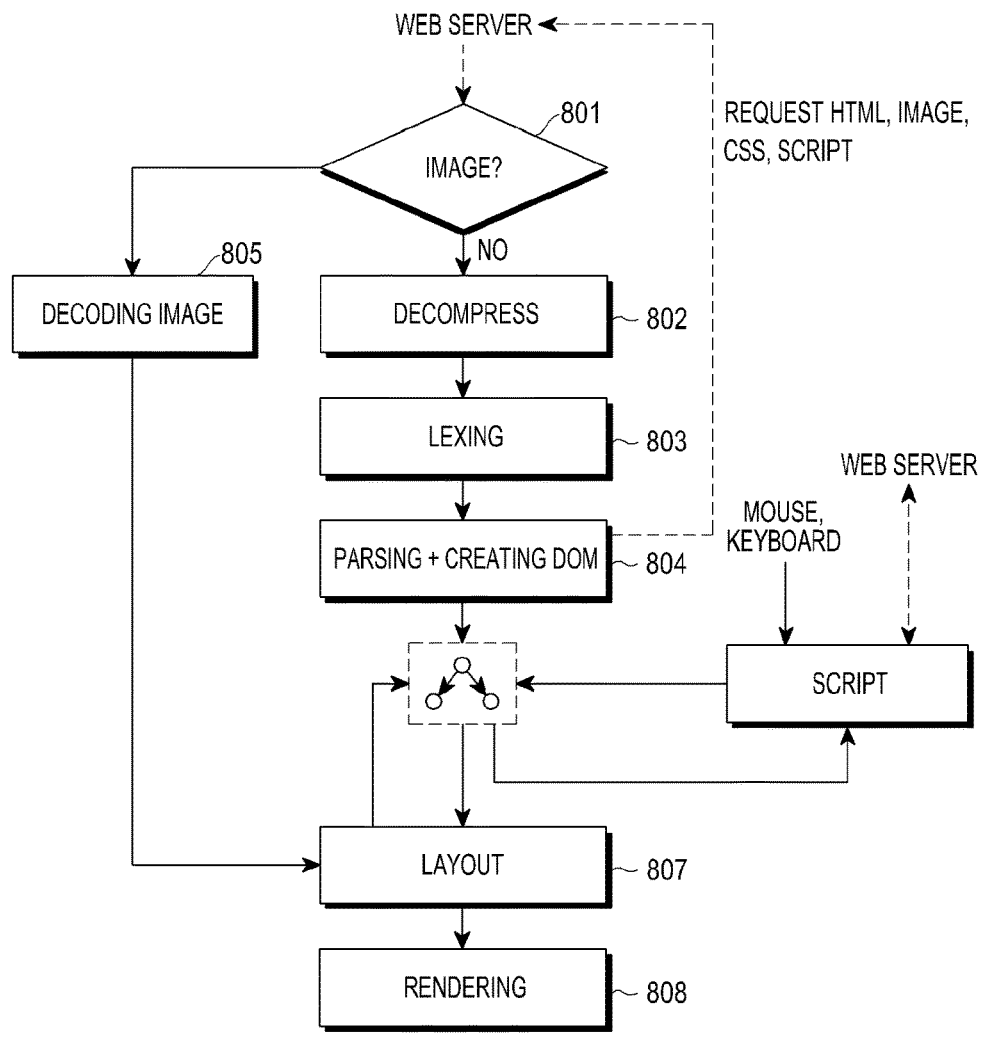

[Fig. 7]
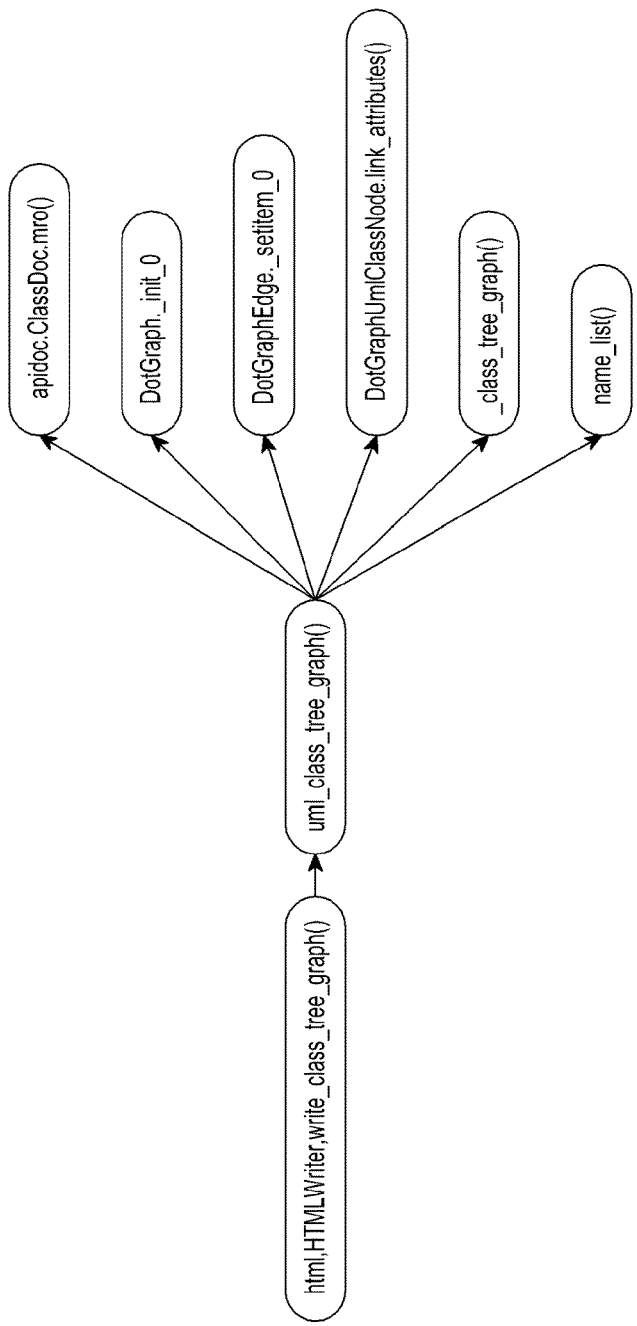
[Fig. 8]
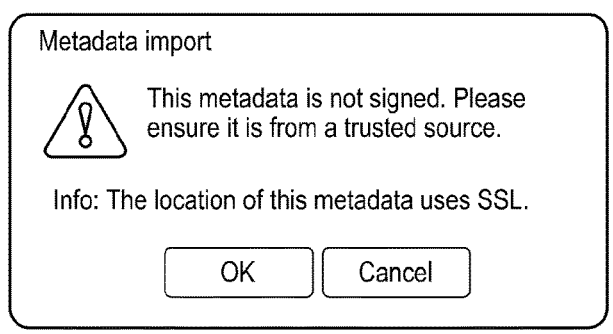

METHOD AND APPARATUS FOR PREVENTING INJECTION-TYPE ATTACK IN WEB-BASED OPERATING SYSTEM

TECHNICAL FIELD

The present disclosure relates to a method and system for detecting the running of a malicious code which is injected within in the execution context of a widget in a device having a web based Operating System (OS).

BACKGROUND ART

In order to satisfy a wireless data traffic demand which is being increased after a $4^{th}$ Generation (4G) communication system has been commercialized, an effort is made to develop an improved $5^{th}$ generation (5G) communication system or a pre-5G communication system. For this reason, the 5G communication system or the pre-5G communication system is called a Beyond 4G network communication system or a post LTE system.

In order to achieve a high data transmission rate, it is considered to implement the 5G communication system in an ultrahigh frequency band (mmWave) (e.g., 60 GHz). In order to alleviate a path loss of a radio wave or increase a delivery distance of a radio wave, beamforming, a massive Multi-Input Multi-Output (massive MIMO), a Full Dimensional MIMO (FD-MIMO), an array antenna, analog beamforming, and a large scale antenna are discussed in the 5G communication system.

Further, in order to improve a network of a system, technologies such as an evolved small cell, an advanced small cell, a cloud Radio Access Network (cloud RAN), an ultra-dense network, a Device-to-Device communication (D2D communication), a wireless backhaul, a moving network, a cooperative communication, a Coordinated Multi-Points (CoMP), a reception interference cancellation, etc. are being developed in the 5G communication system.

In addition, the Hybrid FSK and QAM Modulation (FQAM) and the Sliding Window Superposition Coding (SWSC) corresponding to the Advanced Coding Modulation (ACM) and the Filter Bank Multi-Carrier (FBMC), the Non-Orthogonal Multiple Access (NOMA), and the Sparse Code Multiple Access (SCMA) corresponding to an advanced access technology, etc. are being developed in the 5G system.

Meanwhile, the Internet is evolved to the Internet of Things (IoT) in which information is transmitted/received between distributed components such as things in a human-centered connection network in which the human generates and consumes information. The Internet of Everything (IoE) technology may be an example where a technology of processing Big data through connection with a cloud server, etc. is coupled to the IoT technology.

In order to implement the IoT, technical elements such as the sensing technology, the wired/wireless communication and network infrastructure, the service interface technology, the security technology, etc. are demanded. Thus, in recent years, technologies for connection between things, such the sensor network, the Machine-to-Machine (M2M) communication, the Machine Type Communication (MTC), etc. are being researched.

In the IoT environment, the intelligent Internet Technology (IT) may be provided which creates new values for people's lives by collecting and analyzing data generated by connected things. The IoT may be applied to fields such as the smart home, the smart building, the smart city, the smart car or the connected car, the smart grid, the healthcare, the smart home appliance, the advanced medical service, etc.

Accordingly, various attempts are being made to apply the 5G communication system to the IoT network. For example, application of the 5G communication technology to technologies such as the sensor network, the M2M communication, the MTC, etc., is implemented by a technique such as the beamforming, the MIMO, the array antenna, etc. Application of the cloud wireless access network as the above-described big data processing technology may be an example of the fusion between the 5G technology and the IoT technology.

Meanwhile, the web-based OS is being widely used at the present time. A notable example thereof is the Tizen OS which is jointly developed by Samsung Electronics and Intel and is targeted to consumer devices such as a smartphone and a SmartTV.

The web-based OS forms an execution environment constructed based on a web browser. This technology allows widgets, which are mainly written in HyperText Markup Language (HTML)/Java script, to be executed in a device, and the widgets are rendered by a runtime engine of the web browser.

The widget is the most general software code running in the web-based OS. As the Web based OS is typically designed for the operation of mobile devices (such as smartphones, tablet, etc.) and SmartTVs, the various widgets are typically supplied to the relevant device from an App-Store, which is most commonly owned by the manufacturer of the specific device. For example, widgets for the Samsung SmartTV are supplied by the Samsung owned App-Store.

As with any new platform, web based operating systems have their own set of security problems and weaknesses, and many of them are inherent to the web OS architecture. The most prominent security weaknesses evolve from the lack of: (a) proper access control; (b) distinct and enforceable user privileges; and (c) a clear separation between the presentation layer and the business logic.

Injection-type vulnerabilities, such as, Cross-site Scripting (XSS) and HTML injections are the most critical vulnerabilities that affect web based applications. These vulnerabilities allow execution of malicious code in the execution context of the vulnerable application (i.e., widget). The above-mentioned type of security weakness amplifies the severity of malicious injection to any widget and an injection that may potentially result in a broad system exploit and a complete security compromise within the consumer device.

Measures against injection attacks are being studied by both the academic and the industry. There are two main approaches for protecting against injection attacks:

Strengthening the input validation: Improper input validation is one of the root causes for injection vulnerabilities. Strengthening the validation can be done either generically by assigning metadata to all user inputs, or specifically by assigning different encodings to trusted and untrusted input sources. Both approaches require significant manual coding by the widget's author, and are prone to the same problems that affect standard input validations.

Limiting the scope in which scripts can execute: This can be performed either by use of a policy embedded in the HTML, and specifying those scripts that are allowed to run on the respective page. Alternatively, a context based policy can be applied to each script execution, respectively, in which only trusted inputs are allowed access to security sensitive resources.

The existing solutions target specific vulnerabilities and require extensive manual changes in existing applications or components used in the web application or widget. None of them target emerging threats such those arising in web based operating systems. None of the known solutions can handle generic HTML malicious injections.

While some of said prior art techniques can be applied to the context of a web based OS, for example, the assigning metadata to the input channels, none of these techniques are specifically designed for a web based OS environment, and thus cannot take advantage of its characteristics, such as, the tight coupling between the App-Store and the web runtime that can be leveraged to achieve better security.

Regardless of the specific type of the security weakness, the user expects the widget to behave in the same manner as intended by its author. Since there are many different types and subtypes of vulnerabilities that can modify the runtime behavior and a widget's user interface (UI), it is advantageous to address the vulnerability problem in its entirety, rather than to focus on the mitigation of various specific threats.

Furthermore, said existing solutions relate to regular web applications and are not suitable to the web based execution environment, therefore, a need arises to address those threats that are specific to web based operating systems, while taking into account its specific architecture.

Meanwhile, the above-mentioned data is presented only as background data for helping understanding of the present disclosure. No determination or insistence about whether any part of the above contents can be applied as the prior art relating to the present invention is made.

DISCLOSURE OF INVENTION

Solution to Problem

An embodiment of the present disclosure provides a method and apparatus for detecting and preventing the exploitation of injection-type vulnerabilities in a Web-based OS environment.

An embodiment of the present disclosure provides a method and apparatus for detecting and preventing the exploitation of injection-type vulnerabilities in a Web-based OS environment and context.

An embodiment of the present disclosure provides a method and apparatus for detecting and preventing the exploitation of injection-type vulnerabilities in a simple and compact manner in a Web based OS environment and context.

In accordance with an embodiment of the present disclosure, a method for detecting a malicious code which is injected into the command stream (i.e. execution code) of a widget running on a web-based OS in a device by a web server in a wireless communication system is provided. The method includes: analyzing the widget in the web server; determining at least one invariant constantly maintained and conserved while the widget is running (i.e. a variable, data value, characteristic or parameter with a known, predictable and/or constant/non-varying value), on the basis of a result of the analyzing; generating a metadata file including data satisfying (i.e. including, associated with, or corresponding to) the at least one invariant; associating the metadata file with the widget and providing the widget in a state in which the associated metadata file is included in the widget.

In some examples of the present disclosure, the data of the at least one invariant comprises one of a HyperText Markup Language (HTML) page, a Java Script (JS) function call graph, an external JS library item used by the widget, and a Cascading Style Sheet (CSS) used by the widget.

In some examples of the present disclosure, the HTML page included in the data of the invariant is a Document Object Model (DOM) tree of the HTML page.

In some examples of the present disclosure, the method further comprises updating the widget, updating the data of the at least one invariant included in the metadata file on the basis of a result of the updating, and providing the updated metadata file to the device.

In accordance with another embodiment of the present disclosure, provided is a method of detecting a malicious code injected in to a command stream of a widget running on a web-based OS by a device in a wireless communication system. The method includes: receiving and executing the widget including metadata from a web server, and analyzing the running widget; determining a first invariant constantly maintained and conserved while the widget is running, on the basis of a result of the analyzing; comparing data of the first invariant with data of a second invariant included in the metadata; issuing an alert when a change equal to or larger than a predefined value is detected between the data of the first invariant and the data of the second invariant.

In some examples of the present disclosure, the data of the first and second invariants comprises at least one of an HTML page, a JS function call graph, an external JS library item used by the widget, and a CSS used by the widget.

In some examples of the present disclosure, the HTML page included in the data of the first and second invariants is a DOM tree of the HTML page.

In some examples of the present disclosure, the analyzing of the running widget comprises performing Uniform Resource Locator (URL) parsing of the running widget, performing protocol processing, performing HTML parsing; and executing a JS of the widget.

In some examples of the present disclosure, the performing the HTML parsing comprises comparing a list including external dependencies used during a runtime of the widget with a list including external dependencies included in the metadata or comparing a DOM tree generated during the runtime of the widget with a DOM tree included in the metadata.

In accordance with an embodiment of the present disclosure, provided is a web server for detecting a malicious code injected into a command stream of a widget running on a web-based OS at a device in a wireless communication system. The web server includes: a controller that analyzes the widget by the web server, determines at least one invariant constantly maintained and conserved while the widget is running, creates a metadata file including data of the at least one invariant, and associates the metadata file with the widget; and a transmission unit that includes the associated metadata file in the widget and provides the metadata file to the device.

In accordance with another embodiment of the present disclosure, provided is an apparatus for detecting a malicious code injected to a command stream of a widget running on a web-based OS in a wireless communication system. The apparatus includes: a controller that receives and executes the widget including metadata from a web server, determines a first invariant constantly maintained and conserved while the widget is running, on the basis of a result of the analyzing, and compares data of the first invariant with data of a second invariant included in the metadata; and a transmission unit that issues an alert when a change equal to or larger than a predefined value is detected between the data of the first invariant and the data of the second invariant.

Other aspects, gains, and core features of the present disclosure are processed with additional drawings, and they are apparent to those skilled in the art from the following detailed description including exemplary embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained with, connect to or with, couple to or with, be communicable with, cooperate with, interleave, juxtapose, be proximate to, be bound to or with, have, have a property of, or the like; and the term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior, as well as future uses of such defined words and phrases.

BRIEF DESCRIPTION OF DRAWINGS

The above and other aspects, features, and advantages of the present disclosure will be more apparent from the following detailed description taken in conjunction with the accompanying drawings, in which:

FIG. 1 illustrates an example of running a widget within a device in a wireless communication system;

FIG. 2 is a flowchart illustrating an operation of providing a widget to a device by an App-store in a wireless communication system according to an embodiment of the present disclosure;

FIG. 3 illustrates an example of detecting injection of a malicious code to a running context of a widget by a device in a wireless communication system according to an embodiment of the present disclosure;

FIG. 4 is a flowchart illustrating an operation of providing a widget to a device by an App-store in a wireless communication system according to another embodiment of the present disclosure;

FIG. 5 is a flowchart illustrating an operation of receiving a widget provided from an App-store by a monitoring module of a device in a wireless communication system according to another embodiment of the present disclosure;

FIG. 6 is flowchart illustrating an operation of detecting injection of a malicious code to the running context of an application by a device in a wireless communication system according to an embodiment of the present disclosure;

FIG. 7 illustrates an example of an attribute of a call graph which is one of invariants of a widget; and FIG. 8 illustrates an example of a warning message alerted when a change equal to or larger than a predetermined value is detected between invariants data included in metadata and invariants data of a widget running in a device.

Throughout the drawings, like reference numerals will be understood to refer to like parts, components, and structures.

BEST MODE FOR CARRYING OUT THE INVENTION

Hereinafter, embodiments of the present disclosure will be described in detail with reference to the accompanying drawings. In the following description, it should be noted that only portions required for comprehension of operations according to the embodiments of the present invention will be described and descriptions of other portions will be omitted not to make subject matters of the present invention obscure. Meanwhile, terms described later are defined in consideration of the functions of the present disclosure, but the meaning of the terms may be changed according to a user, intention of an operator, or convention. Accordingly, the terms should be defined based on the contents over the whole present specification The present disclosure may have various modifications and various embodiments, among which specific embodiments will now be described more fully with reference to the accompanying drawings. However, it should be understood that the present disclosure is not limited to the specific embodiments, but the present disclosure includes all modifications, equivalents, and alternatives within the scope of the present disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

Throughout the description and claims of this specification, the words "comprise" and "contain" and variations of the words, for example "comprising" and "comprises", means "including but not limited to", and is not intended to (and does not) exclude other moieties, additives, components, integers or steps.

Features, integers, characteristics, compounds, chemical moieties or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

According to various embodiments of the present disclosure, an electronic device may include a communication functionality. The terminal may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (e.g., head-mounted device (HMD), electronic clothes, an electronic bracelet, an electronic necklace, an electronic appcessory, an electronic tattoo, or a smart watch).

According to various embodiments of the present disclosure, the electronic device may be a smart home appliance with a communication functionality. The smart home appliance may, for example, be a television, a digital video disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present disclosure, the electronic device may be a medical appliance (e.g., magnetic resonance angiography (MRA) device, magnetic resonance imaging (MRI) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device and a gyrocompass), avionics, security equipment, or an industrial or home robot.

According to various embodiments of the present disclosure, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present disclosure, the electronic device may be a combination of the above-mentioned devices. Further, it will be apparent to those skilled in the art that the terminal according to various embodiments of the present disclosure is not limited to the above-mentioned devices.

Meanwhile, a method and apparatus proposed in an embodiment of the present disclosure can be applied to various communication systems such as an IEEE 802.11 communication system, an IEEE 802.16 communication system, mobile broadcasting services such as a Digital Multimedia Broadcasting (DMB) service, a portable Digital Video Broadcasting-Handheld (DVP-H), and a mobile/portable Advanced Television Systems Committee-Mobile/Handheld (ATSC-M/H) service, etc., a digital video broadcasting system such as an Internal Protocol TeleVision (IPTV) service, a Moving Picture Experts Group (MPEG) Media Transport (MMT) system, an Evolved Packet System (EPS), an LTE communication system, an LTE-Advanced (LTE-A) communication system, a High Speed Downlink Packet Access (HSDPA) mobile communication system, a High Rate Packet Data (HRPD) mobile communication system of the 3rd Generation Project Partnership 2, a Wideband Code Division Multiple Access (WCDMA) mobile communication system of 3GPP2, a Code Division Multiple Access (CDMA) mobile communication system of 3GPP2, a mobile Internet Protocol (Mobile IP) system, etc.

FIG. 1 illustrates an example of running a widget within a device in a wireless communication system.

The web-based OS 70 is a browser-like operating system for use in mobile devices, SmartTVs, and similar devices. The web-based OS 70 may be a sole mechanism which initiates execution of widgets 12a to 12f within a device 10 when used as an OS of the device 10. Further, the web-based OS 70 is generally supplied by an App-store entity 20 of a device manufacturer, corresponding to a sole source to which update and modification of an OS are applied. The term "App-store" is originally associated with a digital distribution platform for a mobile application on iOS developed and maintained by Apple Inc. Later, various other manufacturers and distributors of mobile devices have adopted this type of platform, and the meaning of the term has expanded, and thus now, refers to an application (or widget) distribution and update platform maintained by a manufacturer of each device. In the present disclosure, the term "App-store" refers to the expanded meaning.

In all cases, applications and widgets for distribution are received from a lot of sources. However, due to characteristics thereof, the App-store 20 is considered to be a trusted entity having an assignment ensuring authentication, reliability, and security of the applications and widgets supplied to the device 10. In general, a user of the device 10 uses one App-store 20 owned and operated by a manufacturer of the device 10. Further, as mentioned above, the App-store 20 of the device manufacturer is a supplier of the web-based OS 70 when being used to operate a device. This fact is used by a security system of the present disclosure.

In an embodiment of the present disclosure which will be described below, a method of detecting and preventing injection of a malicious code into the context of a widget running within a web based OS, and execution of the same will be described. Further, the embodiment of the present invention protects devices having a web-based OS from malicious codes.

The solution by the present invention is based on the observation that when a widget executes properly, there are certain invariants or parameters/characteristics that remain constant and are preserved throughout the correct and/or entire execution of the widget (i.e. data values or characteristics which do not change or change by a predetermined amount during execution of the widget). Consequently, by identifying and comparing parameters of a running widget with those expected when the widget is executed correctly (i.e. not compromised), the injection of malicious code can be detected by virtue of identifying differences between the actual and expected parameters of the widget.

FIG. 2 is a flowchart illustrating an operation of providing a widget to a device by an App-store in a wireless communication system according to an embodiment of the present disclosure.

In step 70, the App-Store receives the widget from the widget's author. In step 71, the App-Store analyzes the received widget to determine and extract a structure or collection of invariants which are produced when the widget executes correctly.

In step 72, the App-Store creates a metadata file or another equivalent data file including one or more values that represent the structure or collection of invariants.

In step 73, the App-Store associates the metadata file with the respective widget, and proceeds to step 74 to transmit the widget and the associated metadata file to the device. At this time, the widget and the associated metadata file are selectively encoded and transmitted to the device.

There are various types of invariants that may be used by step 71. For example, the following types of invariants are suitable for use by the present invention: (a) HTML pages; (b) the Java Script (JS) functional call graph; (c) external JS libraries items that are used by the widget; and (d) the CSSs (Cascading Style Sheets) that are used by the widget.

For example, JavaScript functions that are used by the widget are not expected to change after the widget is uploaded to the App-Store. However when the widget's running context is exploited, a new code is added to the widget running context. As a result of this exploitation, the widget may execute one or more new JavaScript functions that were not originally present at the time when the widget was uploaded to the App-Store. Similarly, such an exploit may generate fake items in the HTML page or alternatively it may remove or disguise HTML objects that are a part of the original page.

In an embodiment of the present disclosure, which will be described below, a method of detecting these modifications to invariants of the widget, and displaying that the system is exploited, when the modifications to the invariants are detected, will be described.

FIG. 3 illustrates an example of detecting injection of a malicious code to a running context of a widget by a device in a wireless communication system according to an embodiment of the present disclosure.

A widget 112 which is transmitted to the device 110 from an App-store 120 owned by a manufacturer of the device 110 is associated with a respective metadata file 140, which includes a list of invariants or structural details relating to the invariants, as determined by the analysis process at the App-Store 120. A web-based OS 170 which is supplied to the device 110 from the App-Store 120 is also modified to include a monitoring module 160.

A monitoring module 160 is included in a web-based OS rendering engine. When the widget 112 runs in the device 110, a runtime of the web browser starts execution of the widget 112, and the metadata file 140 of the widget 112 is loaded to the web-runtime together with a code of the widget 112. The monitoring module 160 operates in runtime by parsing a widget code executed to determine and identify the relevant invariants or a structure of the relevant invariants. The monitoring module 160 uses the parsing results to identify the validity, correctness, and accuracy of the invariants or the structure thereof. This identification is performed by comparing the real time parsing results with the corresponding data within the metadata file 140.

When it is identified that there is a mismatch between the real time invariants and the respective data associated with the invariants within the metadata file 140, the monitoring module 160 issues an alert. Further, when respective data within the metadata file 140 and the real-time invariants coincide with each other, the monitoring module 160 concludes that the widget execution context is clean from a malicious code.

The present invention is based on the following assumptions:

There is a tight coupling between the App Store 120 and the Web-based OS 170 (preferably both the App-store 120 and the web-based OS 170 are controlled by the same entity).

Widget exploitation will modify one of the widget's invariants, and this modification can be detected in the device where the widget exploit has just taken place.

Both of the two assumptions are applied in the context of the web-based OS, for the following reasons:

The web based OS, contrary to a traditional operating system, is a relatively constrained environment. Regular users do not build and install a code by themselves, but rather, most of the applications (widgets) come from the App Store. While it is possible to bypass the App Store function, the majority of users do not do so. Since the App Store 160 is almost a sole source for applications (widgets) running on the respective devices, there is a tight coupling between the App Store and the web runtime. This coupling represents how the applications (widgets) are transmitted to the system and a protocol in which the applications (widgets) are automatically updated, in a form in which widgets are packaged.

Widget exploitation invariably changes some of the widget's invariants due to the fact that the only way a widget can misbehave maliciously is by executing a new code or rendering information which can be detected by the system of the present disclosure.

When a widget is firstly received by the App Store, a detailed analysis procedure of the widget is initiated to generate the metadata file 140. Hereinafter, three types of invariants of which the respective lists or structures are included in the metadata file 140 will be described. However, it should be noted that the present disclosure is not limited to any type of invariant, since the present disclosure may use any combination of the invariants or other invariants that may be selected using similar principles. In more detail, the present invention preferably suggests use of the following invariants, i.e., the JavaScript functional call graph, the HTML pages, and the list of external dependencies.

The inclusion of call graph information within the metadata file 140 and a respective identification in real time by the monitoring module 160 allows mitigation of the script injection vulnerabilities. The call graph of the widget 112 may be extracted, for example, by using static code analysis techniques. It should be noted that the invention is not limited to operation with a complete call graph, as it is possible to perform the identification with a reduced call graph which includes some of the codes that are reachable from input controls. The performing of the identification with the reduced call graph will reduce some of the overhead associated with the identification by invention.

Another type of invariant that may be identified by the invention is the list of all functions and global variables. More specifically, the monitoring module 160 may identify, during the execution of the widget, any deviation from the expected list of the invariants or from the respective structure of the invariants by performing identification against the metadata file 140. Of course, as information on the invariants is more complete (i.e. the number of invariants monitored increases and/or the level of detail on each invariant increases), an accuracy of the detection becomes higher.

The call graph analysis may present some challenges due to the dynamic nature of the Java script. Since the graph itself may change during a runtime, it is not always possible to construct a call graph statically. Thus, in an embodiment of the present disclosure, a dynamic call graph is generated in the App-store 120 and dynamic identification is performed at the device 110 during the running time. The dynamic analysis in the App Store may include running the widget multiple times and storing stacks of respective invariant information. The collected invariant information is identified with respect to a fitting thereof into the metadata file. Any stack of the call graph that is not fitted may be ignored, and may not be included in the metadata file 140.

It is also possible to use crowdsourcing for the generation of the call graph. In this scenario, the widget is executed multiple times on multiple devices, and then all the stacks are collected and compared with an existing call graph. All the paths that are not yet included in the existing call graph are added to the existing call graph.

The inclusion of HTML in the metadata file 140 allows alleviation of HTML injection vulnerabilities. During the widget execution, when the monitoring module 160 detects that the HTML Document Object Model (DOM) is not matched with the HTML DOM that is included in the metadata file 140, an alert is issued. Since substantially all the HTML parsers have a function of building a DOM of a parsed HTML page, the creation of an HTML DOM, as is done in the App Store, is relatively simple and may be efficiently implemented.

The list of all the external functions that are used by the widget may also be included in the metadata file 140. This list of the external functions includes, among others, the respective versions. This fact allows detection of an exploit where a malicious library having the same name is downloaded by an attacker within the device. Another invariant of this type of attack is where an older version of a same library which is known to have certain vulnerabilities is brought to device by an attacker. The inclusion of the appropriate version number in the metadata file ensures the integrity of the library, as well as of the widget itself.

As above, the monitoring module 160 existing in the web-based OS 170 is included in the web-based OS rendering engine.

In an embodiment of the present disclosure, when the widget is executed at the device 110 in web runtime, the metadata file 140, which is in fact a part of the widget, is loaded as well, and the web runtime begins a simultaneous execution of the monitoring module 160. Due to this process, the widget's invariant data are extracted in a similar manner as was done in the App Store. The widget execution, according to the invention, may comprise several additional steps as follows: (a) identifying the dependencies (i.e., the code components that are necessary to put into the page so that the page rendering will succeed) of the page (external JS, CSSs, images, and so on); (b) HTML parsing that includes building a DOM for rendering the page; and (c) executing JavaScript. The function of the monitoring unit 160 may be implemented in a form of special callbacks that are called at appropriate points in the following three steps:

During the widget execution, the monitoring module 160 records and maintains a respective list of all (or a part of) the libraries and CSSs that are loaded by the widget during run-time. At the end of this process, a callback is performed to compare the list with the respective data within the metadata file 140. If a deviation is detected in either names or versions of the libraries, an appropriate alert is triggered.

An HTML parsing function in the monitoring module 160 builds a DOM tree which is an entity which a layout manager of the widget operates. Upon completion of the creation of the DOM tree, a callback is initiated, and the DOM or its parts are compared with the corresponding data in the metadata file 140. When a deviation is found in the DOM structure or in the DOM elements, then an alert is generated.

The JS interpretation consists of 3 stages: (a) a parsing step where the syntax is validated and respective binary representation is built; (b) a function resolution step where all the functions are registered; and (c) a code execution step where the code is "played back". According to the present invention, the call back is inserted into the third stage. In the third step, it is possible to check whether the stack matches the call graph as created in the App Store. Further, in the third step, it is also possible to determine whether a special predefined sensitive function is called, or whether there is an unexpected access to a security sensitive resource. In the case that one of these events is detected by the monitoring module 160, an appropriate alert is triggered.

Example

FIG. 4 is a flowchart illustrating an operation of providing a widget to a device by an App-store in a wireless communication system according to an embodiment of the present disclosure.

In step 601, the App-Store receives the widget from the widget's author or other appropriate source. In step 602, the App-Store parses the received widget, and creates a call graph of the widget.

In step 603, the App-Store creates a list of DOMs for all the HTML pages. In step 604, the App-Store creates a list which includes all the external dependencies (i.e., libraries and cascading stylesheets) that are used by the widget.

In step 605, the App-Store stores the data that was accumulated in steps 602, 603, and 604 in the metadata file 140. In some examples, the metadata may be securely bound to the widget via the use of encryption and/or signing for example, such that the metadata is securely provided along with the widget and tampering of the metadata may be detected. In other examples, the method may also include the creation and storage of other parameters or characteristics (i.e. invariants) of the widget or a subset of the aforementioned invariants.

FIG. 5 is a flowchart illustrating an operation of receiving a widget provided from an App-store by a monitoring module of a device in a wireless communication system according to another embodiment of the present disclosure.

In step 701, the monitoring module receives and executes a widget provided from the App-Store, and performs a URL parsing of the running widget. In step 702, the monitoring module performs a protocol handling.

In step 703, the monitoring module performs an HTML parsing. More specifically, in step 703, the monitoring unit creates a list which summarizes all the external functions that are used by the widget during runtime, and compares the list with the corresponding list in the metadata file. Furthermore, the monitoring unit creates a DOM tree for the running widget, and when the running widget is completed, the monitoring unit compares the DOM tree with the corresponding DOM tree in the metadata file 160. When any deviation is found, the monitoring unit issues an alert.

In step 704, the monitoring module executes the JavaScript of the widget. The monitoring unit compares the temporary function stack with the call graph stored in the metadata file while the Java Script of the widget is executed, and issues an alert when a deviation is detected.

In step 705, the monitoring module performs a page layout calculation.

As for FIG. 4, one or more other characteristics or a subset of the characteristics (i.e. invariants) may be monitored by the monitoring module and compared to the corresponding values stored in the associated metadata.

FIG. 6 is flowchart illustrating an operation of detecting injection of a malicious code to the running context of an application by a device in a wireless communication system according to an embodiment of the present disclosure.

In step 801, a device checks whether an application received from a web server (e.g., the App-Store) is an image. When it is checked that the received application is an image, the device proceeds to step 805 to decode the received image.

When it is checked that the received application is not an image, the device proceeds to step 802 to decompress the received application. In step 803, the device performs lexing of the decompressed application.

In step 804, the device performs parsing of the lexed application, and creates a DOM for the lexed application.

In step 806, the device detects injection of a malicious code to an execution context by comparing the DOM created in step 804 with the DOM included in the metadata received from the web server.

When the injection of the malicious code is not detected, the device proceeds to step 807 to perform a layout, and the device performs rendering, in step 808.

FIG. 7 illustrates an example of an attribute of a call graph which is one of invariants of a widget.

A call graph "uml_class_tree_graph( )" may include a plurality of attributes illustrated above, for example, apidoc. ClassDoc.mro( ), DotGraph_init_( ), DotGraphEdge_setitem_( ), DotGraphUmlClassNode_link attributes( ), and _class_tree_graph( ) and name_list( ).

FIG. 8 illustrates an example of a warning message alerted when a change equal to or larger than a predetermined value is detected between invariants data included in metadata and invariants data of a widget running in a device.

When the change equal to or larger than a predetermined value is detected between the invariant data of the widget running in the device and the invariant data included in the metadata of the widget received from the web server, the device alerts a warning message as illustrated above to alert the user of the device to a potential security issue.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes and code segments for achieving the present invention may be easily interpreted by programmers skilled in the art which the present disclosure pertains to.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention.

Accordingly, the present invention includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Although the embodiment has been described in the detailed description of the present disclosure, the present disclosure may be modified in various forms without departing from the scope of the present disclosure. Therefore, the scope of the present invention should not be defined as being limited to the embodiments, but should be defined by the appended claims.

The invention claimed is:

1. An apparatus for detecting a malicious code injected to a widget running on a web-based operating system (OS), the apparatus comprising:
   a transceiver; and
   at least one processor configured:
      receive and execute the widget including a metadata file from a web server, wherein the metadata file includes data of at least one characteristic of the widget to be constantly maintained while the widget is running on the web-based OS of the apparatus,
      analyze the widget, while the widget is running on the web-based OS of the apparatus,
      identify a first characteristic related to an external function used by the widget, among the at least one characteristic of the widget based on a result of the analyzing,
      compare first data of the first characteristic obtained by the at least one processor while running the widget with second data of the first characteristic included in the metadata file,
      identify that the first data of the first characteristic is changed by the malicious code based on a difference between the first data of the first characteristic and the second data of the first characteristic, and control the transceiver to provide an alert based on the identifying that the first data of the first characteristic is changed.

2. The apparatus of claim 1, wherein the first data of the first characteristic and the second data of the first characteristic comprise at least one of a hypertext markup language (HTML) page, a java script (JS) function call graph, an external JS library item used by the widget, or a cascading style sheet (CSS) used by the widget.

3. The apparatus of claim 2, wherein the HTML page includes a document object model (DOM) tree of the HTML page.

4. The apparatus of claim 1, wherein the at least one processor is further configured to:
parse a uniform resource locator (URL) of the widget;
process a protocol;
parse hypertext markup language (HTML) of the widget; and
execute java script (JS) of the widget.

5. The apparatus of claim 4, wherein the at least one processor is further configured to:
compare a list including external dependencies that are used during a runtime of the widget with a list including external dependencies included in the metadata file; or
compare a document object model (DOM) tree generated during the runtime of the widget with a DOM tree included in the metadata file.

6. A method of detecting a malicious code injected into a widget running on a web-based operating system (OS) by a device, the method comprising:
receiving and executing the widget including a metadata file from a web server, wherein the metadata file includes data of at least one characteristic of the widget to be constantly maintained while the widget is running on the web-based OS of the device;
analyzing the widget, while the widget is running on the web-based OS of the device;
identifying a first characteristic related to an external function used by the widget, among the at least one characteristic of the widget based on a result of the analyzing;
comparing first data of the first characteristic obtained by the device while running the widget with second data of the first characteristic included in the metadata file;
identifying that the first data of the first characteristic is changed by the malicious code based on a difference between the first data of the first characteristic and the second data of the first characteristic; and
providing an alert based on the identifying that the first data of the first characteristic is changed.

7. The method of claim 6, wherein the first data of the first characteristic and the second data of first characteristic comprises at least one of a hypertext markup language (HTML) page, a java script (JS) function call graph, an external JS library item used by the widget, or a cascading style sheet (CSS) used by the widget.

8. The method of claim 7, wherein the HTML page a document object model (DOM) tree of the HTML page.

9. The method of claim 6, wherein the analyzing of the widget comprises:
parsing a uniform resource locator (URL) of the widget;
processing a protocol;
parsing hypertext markup language (HTML) of the widget; and
executing a java script (JS) of the widget.

10. The method of claim 9, wherein the performing of the HTML parsing comprises:
comparing a list including external dependencies used during a runtime of the widget with a list including external dependencies included in the metadata file; or
comparing a document object model (DOM) tree generated during the runtime of the widget with a DOM tree included in the metadata file.

11. The method of claim 6, wherein the metadata file is bound to the widget using at least one of encryption or signing.

12. A method for detecting a malicious code injected into a widget executing on a web-based operating system (OS) of a device, by a web server, the method comprising:
analyzing, by the web server, the widget, while the widget is running on the web-based OS of the device;
identifying at least one characteristic of the widget to be constantly maintained while the widget is running on the web-based OS of the device based on a result of the analyzing;
generating a metadata file including data of the at least one characteristic;
associating the metadata file with the widget;
including the associated metadata file in the widget; and
providing the widget which includes the associated metadata file to the device,
wherein the data of the at least one characteristic is for use to detect the malicious code injected into the widget on the device by comparing the data of the at least one characteristic with data obtained by the device while the widget including the associated metadata file is running on the device.

13. The method of claim 12, wherein the data of the at least one characteristic comprises one of a hypertext markup language (HTML) page, a java script (JS) function call graph, an external JS library item used by the widget, or a cascading style sheet (CSS) used by the widget.

14. The method of claim 13, wherein the HTML page includes a document object model (DOM) tree of the HTML page.

15. The method of claim 12, further comprising:
updating the widget;
updating the data of the at least one characteristic included in the metadata file based on a result of the updating; and
providing the updated metadata file to the device.

16. The method of claim 12, wherein the metadata file is bound to the widget using at least one of encryption and or signing.

* * * * *